United States Patent
Immonen et al.

(10) Patent No.: US 6,728,543 B2
(45) Date of Patent: Apr. 27, 2004

(54) IMPLEMENTATION OF CALL FORWARDING IN A TELECOMMUNICATIONS NETWORK

(75) Inventors: Pekka Immonen, Espoo (FI); Jouko Tenhunen, Helsinki (FI)

(73) Assignee: Nokia Corporation, Espoo (FI)

( * ) Notice: Subject to any disclaimer, the term of this patent is extended or adjusted under 35 U.S.C. 154(b) by 246 days.

(21) Appl. No.: 09/908,186

(22) Filed: Jul. 18, 2001

(65) Prior Publication Data

US 2002/0077091 A1 Jun. 20, 2002

Related U.S. Application Data

(63) Continuation of application No. PCT/FI00/00024, filed on Jan. 14, 2000.

(30) Foreign Application Priority Data

Jan. 18, 1999 (FI) .................................................. 990088

(51) Int. Cl.[7] .............................................. H04M 3/42
(52) U.S. Cl. ................... 455/445; 455/417; 455/414.1; 379/212.01; 379/211.01; 379/211.02
(58) Field of Search ................................ 455/445, 417; 379/211.01, 211.02, 212.01, 414.1

(56) References Cited

U.S. PATENT DOCUMENTS

| | | | |
|---|---|---|---|
| 5,206,901 A | * | 4/1993 | Harlow et al. ......... 379/211.04 |
| 5,471,519 A | * | 11/1995 | Howe et al. ............. 379/88.26 |
| 5,502,762 A | * | 3/1996 | Andrew et al. ........ 379/202.01 |
| 5,818,919 A | | 10/1998 | Berberich, Jr. et al. |
| 6,275,577 B1 | * | 8/2001 | Jackson ................. 379/211.01 |

FOREIGN PATENT DOCUMENTS

| | | | | |
|---|---|---|---|---|
| WO | WO 98/21899 | * | 5/1998 | ............ H04Q/3/00 |
| WO | WO 98/21900 | | 5/1998 | |

OTHER PUBLICATIONS

International Search Report for PCT/FI00/00024.

* cited by examiner

Primary Examiner—Vivian Chin
Assistant Examiner—Lewis West
(74) Attorney, Agent, or Firm—Squire, Sanders & Dempsey L.L.P.

(57) ABSTRACT

A method for forwarding a call in a telecommunications network, where subscriber A's call is transferred using the call forwarding service from subscriber B's first terminal equipment to his/her second terminal equipment, the said second terminal equipment giving an indication of an incoming call. To provide a more user-friendly and less costly service for the user, the system monitors, when forwarding the call, whether the user performs a pre-defined action while the mobile telephone is ringing, and if such an action is detected, the call is re-routed back to the first terminal equipment. The method is particularly suitable for users who have both a fixed-wire telephone line and a mobile telephone.

8 Claims, 3 Drawing Sheets

IMPLEMENTATION OF CALL FORWARDING IN A TELECOMMUNICATIONS NETWORK

This is a continuation of Application No. PCT/FI00/00024, filed Jan. 14, 2000.

FIELD OF THE INVENTION

Generally, the present invention relates to services provided by an intelligent network. More specifically, the invention relates to call forwarding services implemented by means of an intelligent network.

BACKGROUND

A telecommunications network that includes facilities for providing various services and attributes is called an Intelligent Network (IN). It is an architecture built on the existing telecommunications network, and one of its most important features is its ability to segregate call switching from the service logic. The intelligent network offers the subscriber quick and flexible access to personalised services without any modifications to the software at the exchange. This is possible because the services are controlled by a few centralised control points in the intelligent network specifically designed for this purpose.

Figure 1A:
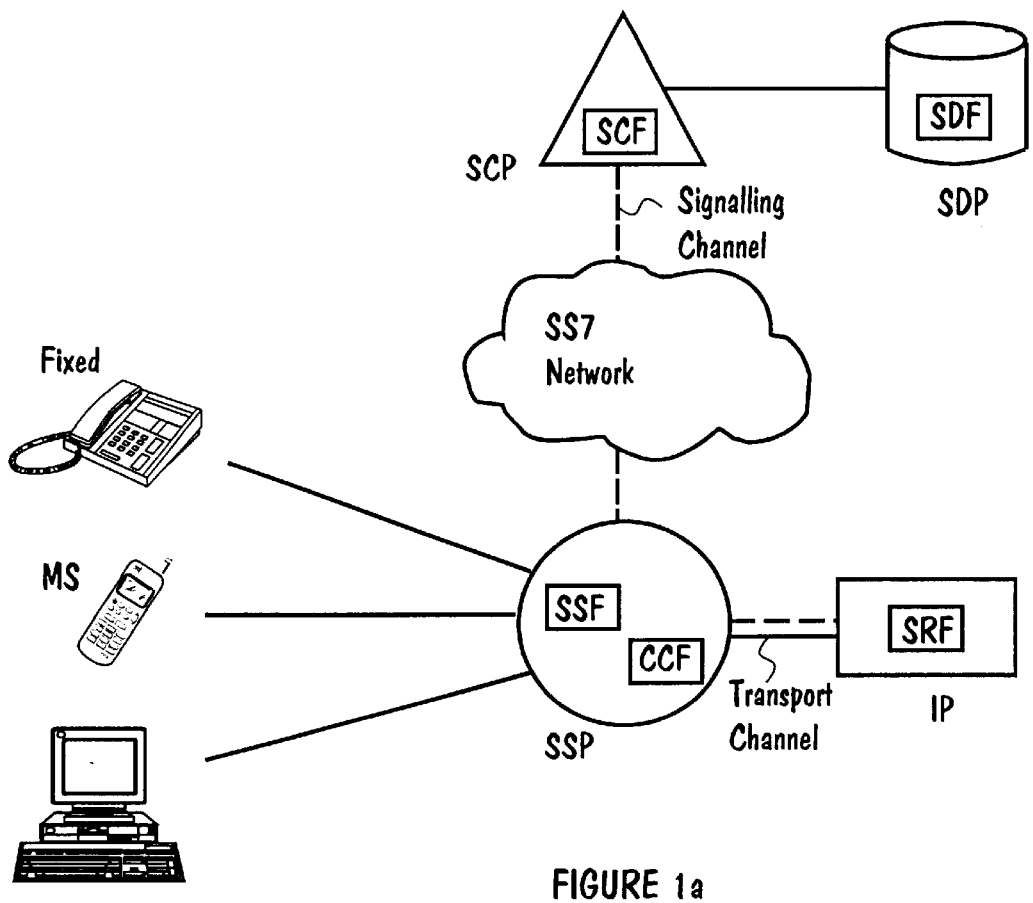

FIG. 1a shows a simplified example of the structure of the intelligent network. Let us first briefly examine the individual components of the intelligent network and the functions residing in these components.

Subscriber Equipment SE, such as a fixed-wire telephone, mobile station (MS), computer or fax machine, is connected directly to a Service Switching Point SSP.

The service switching point SSP gives the user access to the network, makes the necessary selections and offers the opportunity to use the various services available in the intelligent network. SSP performs two main functions: the Call Control Function CCF and the Service Switching Function SSF. The service switching point SSP identifies the call attempts requesting IN services. At the service switching point, the numbers requiring IN control have been defined in the service trigger table. The service switching point SSP requests instructions for routing the call and performing the service from the IN service control function SCF residing in the service control point SCP. In response, the service control point SCP sends to the service switching point SSP the physical number to which the call is routed. An ordinary call that requires no IN features is connected through the exchange in the normal fashion.

The service control point SCP is a digital exchange or dedicated computer with the necessary software. It contains the service logic, the service control functionality and the service database function. Often, the database is a Service Data Point SDP that is separate from the service control point SCP. The service control point SCP processes the service data in the database by means of its own Service Logic Program LCP and controls the service switching point SSP. Signalling between the service switching point SSP and service control point SCP is carried out via the common channel signalling network SS7 using the INAP protocol.

The service data point SDP contains the data that the service logic programs SLP use to generate personalised services. The service control point SCP can make use of the services offered by the service data point SDP.

The Intelligent Peripheral IP offers specialised services and supports flexible data communications between the user and the network. The intelligent peripheral IP features the Specialised Resource Function SRF that offers an interface to network mechanisms involved in the interaction with the user. Typical examples of such mechanisms are the announcements made to the subscriber and receiving of the subscriber selections.

The various phases of call control are modelled on the ITU-T recommendation Q.1214 by means of the Basic Call State Mode BCSM. Call set-up at the exchange consists of two processes: the originating call set-up (subscriber A) and terminating call set-up (subscriber B), the corresponding state modes being the Originating Basic Call State Mode O_BCSM and the Terminating Basic Call State Mode T_BCSM. The state mode consists of Points In Call PIC, the Detection Point DP and transitions between the various modes. The detection point can serve either as Trigger Detection Points TDP or Event Detection Points EDP. DP1 is also known as a "hot-line-trigger" because it permits IN triggering immediately when the receiver is picked up. The TDP and EDP can be of either the Request or Notification type. If the point is of the Request type, SSP suspends call processing and asks for additional instructions from the SCP, whereas with the Notification type point, the SSP continues call processing normally, but notifies the SCP of point detection, which creates a relationship in which the SCP monitors the SSP.

Figure 1B:
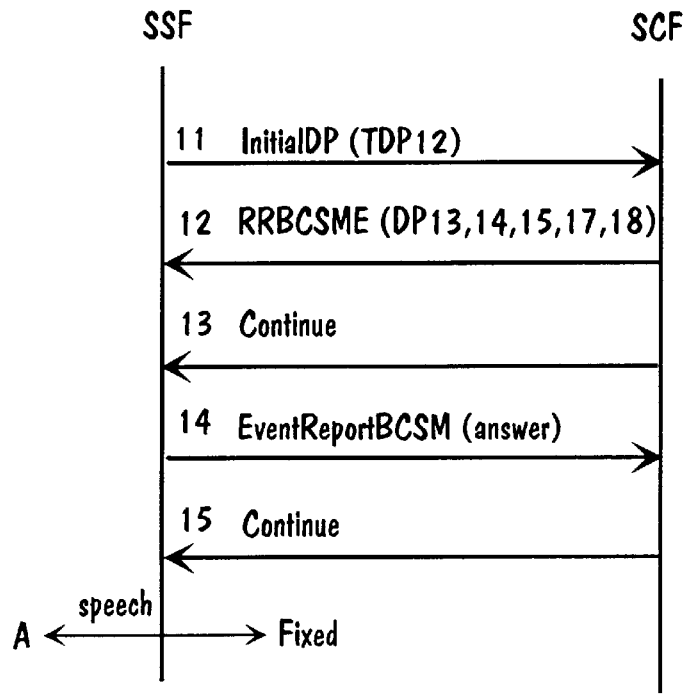

FIG. 1b is a signalling diagram showing the signalling process when a connection is made between subscribers A and B (fixed-wire telephone). The SSP detects that a call is being made to subscriber B that requires IN control, in which case it sends an InitialDP signal to the SCP at point 11. The SCP responds by sending the standard RRBSCME signal at point 12, indicating the detection points to be reported, which are: DP13 meaning that subscriber B's line is busy, DP14 meaning that subscriber B does not answer the call, DP15 meaning that subscriber B answers the call, DP17 meaning that either subscriber A or subscriber B terminates the call, and DP18 meaning that subscriber A gives up before subscriber B answers the call. At point 13, the SCP sends a Continue signal to proceed with the process. In the case used as the example, subscriber B answers the call, which is reported to the SCP by the SSP at point 14 using the EventReportBCSM signal. At point 15, the SCP responds with the Continue signal, as a result of which the call is sustained normally. In other words, a voice connection is set up between subscribers A and B and they can converse with each other.

There is a great variety of intelligent network services available and their number is increasing all the time. Here are a couple of examples of IN services: the Universal Access Number UAN, which makes it possible to call a subscriber using a single number even if he/she has dedicated telephone lines to several sites located in different areas; the Personal Number, which is independent of the network and allows the intelligent network to re-route calls made to the number involved as instructed by the subscriber; and Call Forwarding CF, where the call is transferred to another pre-defined number. The subscriber may activate the call forwarding service, for example from a fixed-wire telephone to a mobile telephone, by keying in a certain code and the mobile telephone number using the keypad of the fixed-wire telephone. Call forwarding is cancelled by keying in a pre-defined cancellation code, similarly using the keypad of the fixed-wire telephone. Call forwarding may be activated from a fixed-wire telephone at home or in the office to a mobile telephone. Once call forwarding has been activated, the fixed-wire telephone will not ring because the exchange has detected that the call forwarding service has been activated and, therefore, sends the call to the mobile telephone. It is possible, however, that the subscriber activating call forwarding is near the fixed-wire telephone (used for activating call forwarding) when the mobile telephone rings and would rather take the call on the fixed-wire telephone. At present, this is not possible.

Accordingly, the aim of the present invention is to eliminate this drawback and improve the service by making it more user-friendly as well as less expensive.

A BRIEF SUMMARY OF THE INVENTION

The present invention relates to intelligent network services and specifically to call forwarding, where calls are forwarded, for example, from a fixed-wire telephone to a mobile telephone.

The aim of the invention is to provide a solution that improves call forwarding services by making it more user-friendly both in terms of function and cost. This is achieved as described in the independent patent claims.

The idea of the invention is to monitor the subscriber equipment from which calls have been forwarded even after the subscriber unit to which the calls have been forwarded has been notified of the incoming call in order to see whether the user takes some pre-defined action, such as lifting the receiver. If such an action is detected, the call is re-routed to the subscriber unit from which calls have been forwarded. The service based on the invention is particularly convenient for subscribers who have both a fixed-wire line and a mobile telephone. Once the subscriber has activated call forwarding from his fixed-wire telephone to his mobile telephone, he can also take the incoming call on the fixed-wire telephone even if it is not ringing. When call forwarding has been activated and a call is about to be connected to the fixed-wire telephone (subscriber A), the SSP monitors the detection point TDP1 to determine whether the receiver of the fixed-wire telephone (subscriber B) is lifted. The re-routing process is initiated when subscriber B lifts the receiver of the fixed-wire telephone. The service control point SCP controls the call forwarding service by giving processing and routing instructions for the service switching point SSP. More precisely, the SCP activates the said "hot-line" trigger detection point, after which it switches to the monitoring mode to supervise call forwarding, which may be direct or conditional.

The invention makes the call forwarding service less expensive because the subscriber does not have to pay for the leg used for forwarding.

Another advantage offered by the invention is that this can be implemented using the standard Capability Set 2 CS-2 features of the intelligent network.

LIST OF DRAWINGS

Figure 2:
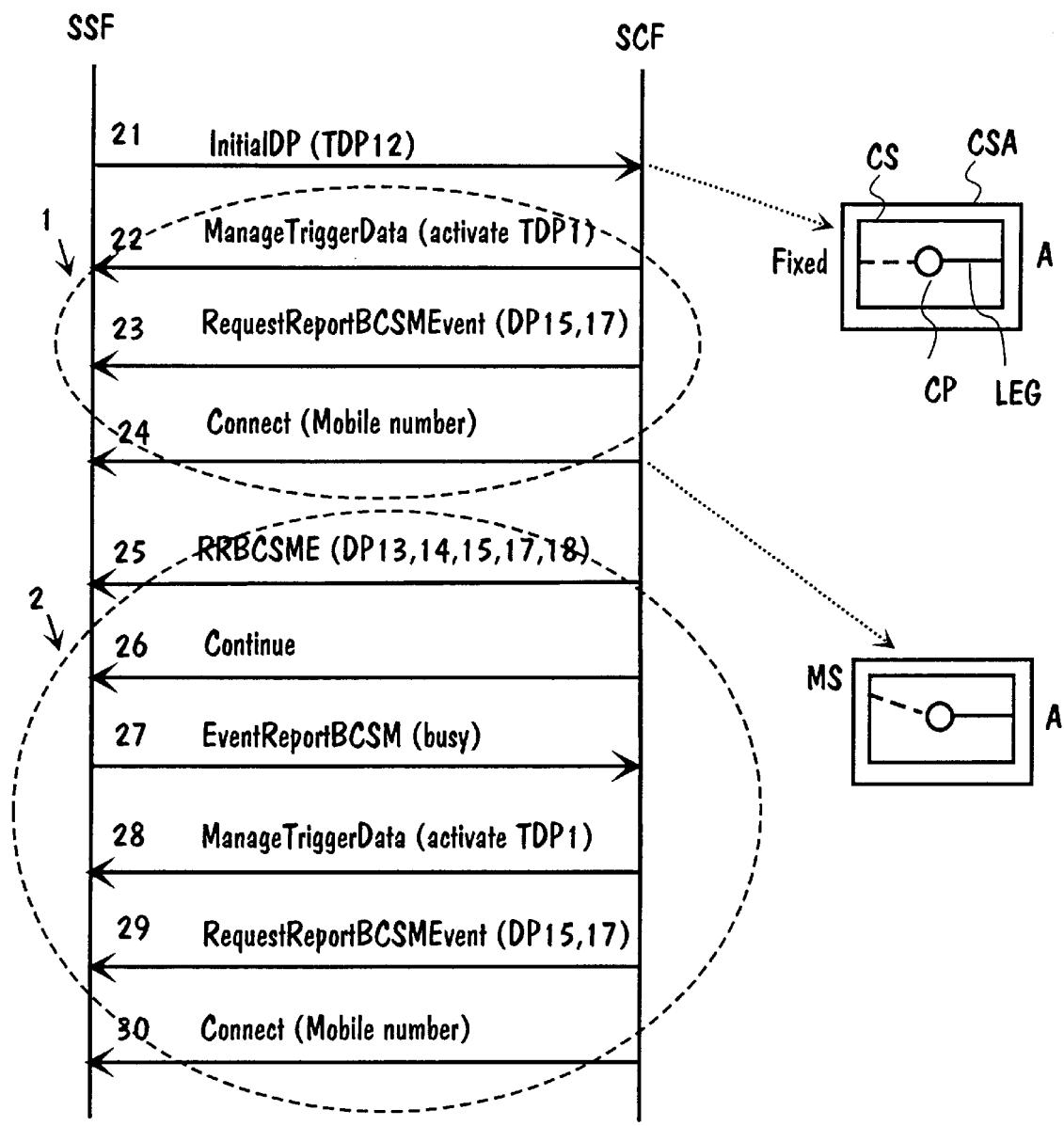
Figure 3:
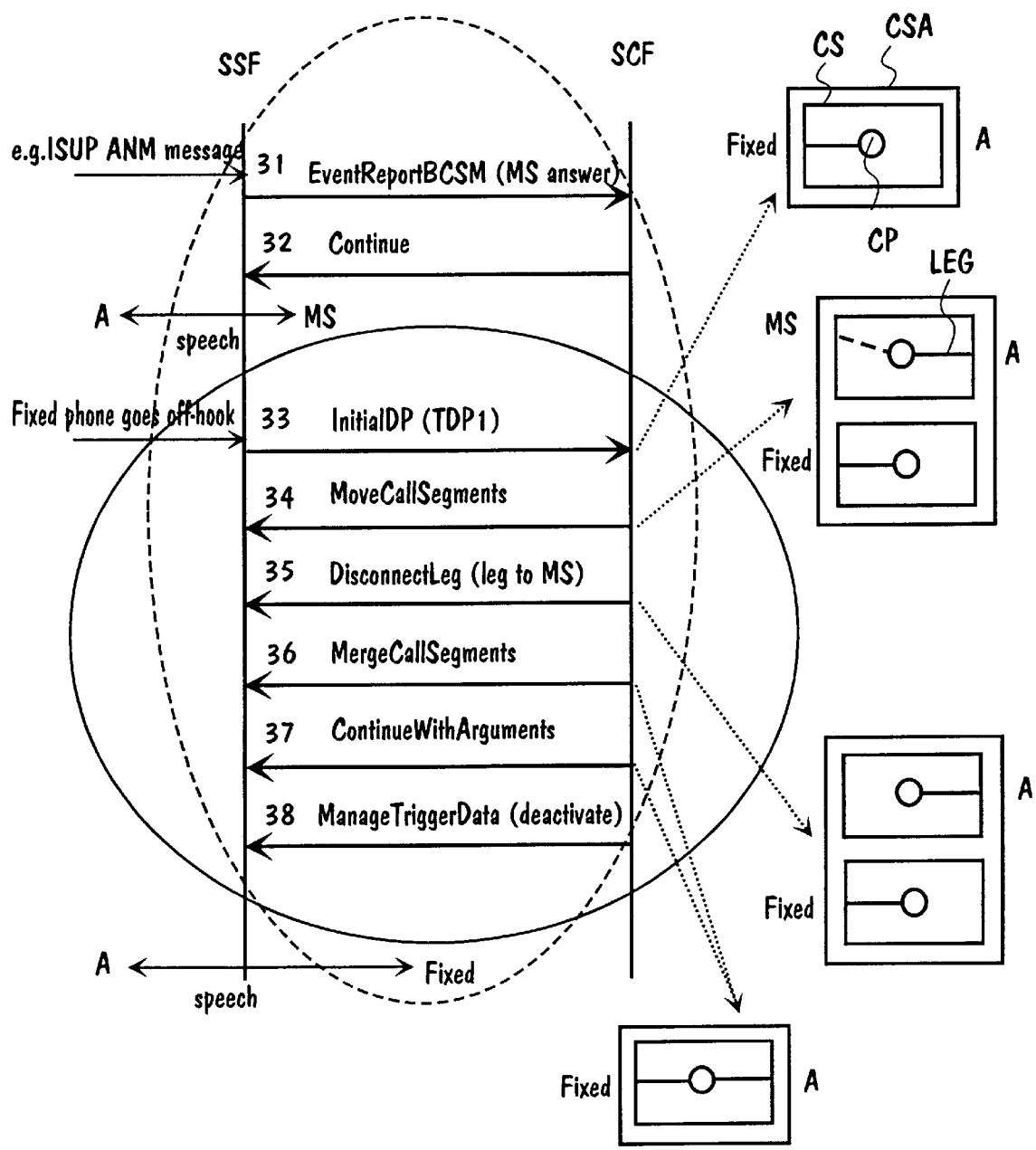

The following provides a more detailed description of the invention with reference to the examples given in the attached drawings, where FIG. 1a is a diagram showing the structure of an intelligent network, FIG. 1b shows message exchange between the SSP and the SCP during call set-up, FIG. 2 shows communications between the SSP and the SCP related to the call to determine whether the receiver is lifted, FIG. 3 shows another embodiment of the call-related communications between the SSP and the SCP in accordance with the invention using re-routing accordance with the invention.

DETAILED DESCRIPTION OF THE INVENTION

Let us examine, by way of an example, a situation where subscriber A wishes to set up a voice connection to the fixed-wire telephone of subscriber B. Subscriber B has activated call forwarding from the fixed-wire telephone to the mobile telephone of subscriber C. In this example, subscriber B and subscriber C are one and the same person. Call set-up between subscriber A and subscriber B is examined by means of the diagram shown in FIG. 2, which shows signalling between the service switching function SSF residing in the service control point SCP on the one hand and the service control function SCF residing in the service control point SCP on the other. A call set-up message SETUP arrives from subscriber A to the exchange in the fixed-wire network to which the fixed-wire telephone of subscriber B is connected. When the service switching function SSF of this exchange detects the IN service request (the SSP detects DP12, i.e. a call attempt to subscriber B), it sends, at point 21 in the diagram, the InitialDP message via the signalling network SS7 to the service control function SCF to ask for instructions for routing and processing the call. The first dialogue corresponds to the state mode T_BSCM. The figure provides a presentation of the various phases of the call by means of objects in accordance with the CS-2 architecture as defined in the ITU-T recommendation 1.224 using the signalling method as in the said recommendation. For each connection, a Call Segment Association CSA is created that contains the Call Segment CS and two objects namely the leg and the Connection Point CP. Viewed from the CSA end, the leg describes the connection path towards the receiving unit while the connection point is the switching location of the legs, allowing the information flow to pass over the individual legs. The state of the leg is shown in the figure in two ways: (1) the dashed line indicates that a signalling connection has been established but that no voice channel has been opened, and (2) the solid line means that a voice connection has been set up. In accordance with the invention the service control function SCF responds to the SSF's request by sending the MangerTriggerData procedure at point 22, which is used, in compliance with CS-2, to activate or trace the TDP state linked to the subscriber's profile. In this case, the message is used to activate TDP1 (monitoring whether subscriber B picks up the receiver or not). If TDP1 is not activated in the SSP (the detection point may be active, for example, because of an earlier intelligent network operation), the detection point TDP1 is activated for subscriber B. The SSP monitors TDP1 and when it detects that subscriber B has picked up the receiver, it immediately sends the InitialDP message to the SCP for potential further action. In accordance with the CS-1 standard, detection points can be activated statically, but CS-2 allows dynamic activation of detection points. At point 23, the SCF sends the operation RequestReportBSCMEvent to the SSF, which indicates to the SSP the detection point that it must report to the SCP. Here, detection point DP15 is activated to detect when subscriber B takes the call and detection point DP17 is activated to detect if subscriber A or subscriber B terminates the call. At point 24, the SCP sends routing instructions for the mobile station to the SSP using the Connect signal.

The following provides a description of signalling in a situation that is identical to the one discussed above except that subscriber B's fixed-wire telephone line is busy. Let us assume that the SSP has sent the InitialDP signal to the SCP as explained at point 21 to receive instructions for processing the incoming call. Then, at point 25, the SCF sends the RequestReportBSCMEvent operation to the SSF, in which it indicates the new detection point to be reported (DP13, 14, 15, 17, 18). The contents of the detection points are as follows: detection point DP13 indicates that subscriber B's line is busy; detection point DP14 represents the event that subscriber B does not answer the call; DP15 and DP17 serve the same function described in the foregoing paragraph, and detection point DP18 indicates a situation where subscriber A gives up before subscriber B answers. Next, the SCF transmits the Continue operation, requesting that call processing be continued. The SSF responds to the SCF by sending a notification indicating that subscriber B's line is busy using the EventReportBCSM(busy) signal. The signals described in points 28 through 30 are identical to those in points 22 through 24.

The signals contained within ellipse 1 are related to direct call forwarding in the intelligent network and those contained within ellipse 2 to conditional forwarding, the condition in this example being that the receiver's line is busy. Another instance of conditional call forwarding could be a situation where the number does not answer.

The signalling pattern in FIG. 3 shows a situation where the call is routed to subscriber C's mobile telephone and subscriber B answers the call that has already been forwarded using the fixed-wire telephone. The corresponding state mode is O_BCSM. For the purposes of this example, it is assumed that TDP1 has been activated as described above. The SSP for subscriber B detects when the mobile telephone answers, at which moment the SSP immediately sends, at point 31, the EventReportBCSM signal to the SCP, which, when detecting that a call connection is being set up, sends, at point 32, the Continue signal to ensure that signal processing is continued. Now, subscriber C has the option of either continuing the call on the mobile telephone or, if close to the fixed-wire telephone used for forwarding the call, taking the call forwarded to the mobile telephone on that particular fixed-wire telephone. To do so, all the subscriber has to do is to pick up the receiver of the fixed-wire telephone because the SSP was previously set to monitor detection point TDP1. Upon detecting that the receiver is lifted, the SSP reports it immediately by sending, at point 33, the InitialDP signal to the SCP. The Call Segment Association CSA, as shown in the figure, is created when the connection is set up. An analysis carried out by the SCP shows that the TDP1 involved is the detection point that was earlier activated and associates the through-call with the call attempt in the same CallSegmentAssociation by sending, at point 34, the MoveCallSegments signal, informing the SSP that they are inter-related. Additionally, the SCP asks the SSP, at point 35, to disconnect the leg to the mobile telephone by sending the signal DisconnectLeg. At this point, there are two CallSegments "suspended" in the same CallSegmentAssociation, i.e. voice channels have not yet been set up between subscribers A and B. The SCP gives the instructions to inter-connect these voice channels to each other by sending, at point 36, the MergeCallSegments signal. Because the CallSegment contains only one leg, a MoveLeg signal can be used instead of the MergeCallSegment operation to achieve the same effect. After this, the SCP requests the SSP, at point 37, to continue call processing from that point onwards using the ContinueWithArguments signal. At point 38, the SCP sends the ManageTriggerData signal to request deactivation of TDP1 monitoring to ensure that no confusion is created when the receiver is picked up later. The SCP is aware of at which stage of the call TDP1 is deactivated, and this may vary according to the subscriber's wishes. In other words, the subscriber may, when ordering the service, agree with the service provider to select those options that are best suited for him. For example, the following options are available:

TDP1 is deactivated
when a connection has been set up between subscribers A and B after subscriber C has been alerted
when a specific period of time t has elapsed since subscriber C has answered the call
immediately when subscriber C answers the call
when subscriber A gives up trying to make the call
when the call from subscriber A to subscriber C has ended
following satisfaction of some other condition specified by the subscriber.

Such a condition could be an instruction for the SCP to check the number from which the call is coming and compare it with the conditions specified by the subscriber. For example, if the number is one of the numbers for which the subscriber has defined the condition that it must not be routed to his home (work) number, TDP1 will be deactivated.

The dashed-line ellipse in the figure relates to signalling in the event that the mobile telephone answers but the call is continued using the fixed-wire telephone, in which case the connection to the mobile telephone must be terminated. The solid line ellipse shows a situation where the mobile telephone rings but the call is answered by picking up the receiver of the fixed-wire telephone, by which time no voice channel has yet been set up to the mobile telephone.

Although the invention has been explained with reference to the examples shown in the attached drawings, the invention can naturally be varied within the scope of the idea of the invention presented in the foregoing and the enclosed patent claims. The terminal equipment need not necessarily be telephones and the connection established need not necessarily be a voice connection. Depending on the type of terminal equipment involved, some other operation instead of the lifting of the receiver may be monitored. The operations shown in FIGS. 2 and 3 can be sent either as separate messages or using a TCAP message that contains one or several operations. The operations need not be performed in the sequence shown. For example, the point when the TDP is activated or deactivated may vary. Moreover, the foregoing example lists only the detection points (DP) that are significant to the example involved, but other detection points can be activated depending on the applicable rules. Furthermore, call forwarding can be implemented by incorporating it in an IN hunting service or some other similar service, depending on the preferred attributes of the total service required. A solution in accordance with the invention is, of course, not limited to a CS-2 standard architecture, but can be implemented using any other standard.

What is claimed is:

1. A method for call forwarding in a telecommunications network the method comprising:
    forwarding, via an intelligent network, a call from subscriber A from a first terminal equipment of subscriber B to a second terminal equipment;
    monitoring whether the subscriber B carries out a pre-defined action on the first terminal equipment
    or on the second terminal equipment: wherein the method further comprises:
        if the pre-defined action is detected on the first terminal equipment, re-routing the call to the first terminal equipment, and
        if the pre-defined action is detected on the second terminal equipment, routing the call to the second terminal equipment and monitoring further whether the subscriber B carries out a pre-defined action on the first terminal equipment and, if said pre-defined action is detected on the first terminal equipment, disconnecting the call routed to the second terminal equipment.

2. A method in accordance with patent claim 1 wherein such a predefined action is the activation of the subscriber line, preferably by lifting of the telephone receiver.

3. A method in accordance with patent claim 1 wherein monitoring is started by activating, by means of the intelligent network service control function, the service trigger point TDP1 in the call state mode that the service switching point uses to process the call attempt.

4. A method in accordance with patent claim 1 wherein monitoring is ended when a connection has been set up between subscriber A and the first terminal equipment of subscriber B.

5. A method in accordance with patent claim 1 wherein monitoring is ended when subscriber A gives up the attempt to set up a connection.

6. A method in accordance with patent claim 1 wherein monitoring is ended when the connection set up between subscriber A and subscriber B's second terminal equipment is terminated by either party.

7. A method in accordance with patent claim 1 wherein monitoring is ended when a pre-defined condition specified for the calling number is not satisfied.

8. A method in accordance with patent claim 1 wherein call forwarding and returning the call to the original number called is implemented using procedures in the accordance with the CS-2 (capability set 2) architecture.

* * * * *